United States Patent [19]

Siegel et al.

[11] Patent Number: 5,182,543
[45] Date of Patent: Jan. 26, 1993

[54] MINIATURIZED DATA COMMUNICATION AND IDENTIFICATION SYSTEM

[75] Inventors: Marvin Siegel, East Lansing; William Donohue, Haslett, both of Mich.; Michael J. Francois, Cedar Rapids, Iowa

[73] Assignee: Board of Trustees operating Michigan State University, East Lansing, Mich.

[21] Appl. No.: 581,366

[22] Filed: Sep. 12, 1990

[51] Int. Cl.$^5$ .................... G08B 1/00; H04B 10/00
[52] U.S. Cl. .................... 340/531; 340/555; 340/573; 359/152; 359/174
[58] Field of Search ............ 340/531, 506, 539, 555, 340/556, 571, 572, 534, 573; 455/600, 603, 606; 358/434, 444, 404; 359/109, 174, 177, 152

[56] References Cited

U.S. PATENT DOCUMENTS

| | | |
|---|---|---|
| 3,465,724 | 9/1969 | Broadbent . |
| 3,972,320 | 8/1976 | Kalman . |
| 4,234,870 | 11/1980 | Sibley . |
| 4,319,332 | 3/1982 | Mehnert ..................... 340/556 |
| 4,559,529 | 12/1985 | Bernhardt ................... 340/571 |
| 4,598,275 | 7/1986 | Ross et al. .................. 340/573 |
| 4,622,540 | 11/1986 | Guscott et al. .............. 340/555 |
| 4,630,035 | 12/1986 | Stahl et al. ................. 340/539 |
| 4,658,357 | 4/1987 | Carroll et al. ............... 340/531 |
| 4,672,365 | 6/1987 | Gehman et al. ............. 340/531 |
| 4,686,513 | 8/1987 | Farrar et al. ................ 340/572 |
| 4,734,680 | 3/1988 | Gehman et al. ............. 340/531 |
| 4,772,955 | 9/1988 | Kurahayashi et al. ........ 358/444 |
| 4,798,175 | 1/1989 | Townsend et al. .......... 340/572 |
| 4,851,815 | 7/1989 | Enkelmann ................. 340/571 |
| 4,854,328 | 8/1989 | Pollack ....................... 340/573 |
| 4,857,893 | 8/1989 | Carroll ....................... 340/572 |
| 4,879,461 | 11/1989 | Philipp ....................... 340/555 |

Primary Examiner—Donnie L. Crosland
Attorney, Agent, or Firm—Ian C. McLeod

[57] ABSTRACT

A miniaturized communications unit for use in object tracking, control and the like. Each communications and identification unit repeatedly transmits an identification code on a predetermined wavelength at a transmission interval randomly selected from within a predetermined time interval range in order to avoid repeated transmission collisions between two or more units. The transmission may further include data corresponding to a sensed environmental attribute. Each unit that receives a transmission stores the received identification code and any data in a time ordered record. This stored record preferably also includes an electronic date and time stamp. The stored data can be transmitted to an external data port for later use or analysis by an external data processor. The preferred construction of these communications and identification units includes a programmed microprocessor circuit with the program preferably stored in an electrically programmable read only memory for the sake of flexibility and ease of alternation.

16 Claims, 2 Drawing Sheets

MINIATURIZED DATA COMMUNICATION AND IDENTIFICATION SYSTEM

TECHNICAL FIELD OF THE INVENTION

The technical field of the present invention is that of electronic object tracking and control and electronic data collection.

BACKGROUND OF THE INVENTION

There are many instances when the tracking of people, animals or objects is useful. Farmers may use tracking systems to track the feed and production of particular animals. These systems may also control the feeding of each animal to optimize production per unit feed or to control entry into particular areas. There are times when objects, such as parts in a flexible automated assembly plant need to be tracked and routed. Each of these tracking and control systems run into similar problems.

One of the problems that must be solved with these systems is that of transmitter collision. In any system tracking two or more objects there must be some manner of distinguishing between the particular units.

It is known in the art to provide the individual units with differing frequencies. A base unit determines which particular unit received by the wavelength of the transmission. Such a system can only be used with a relatively small number of such units because of the spectrum used. This technique tends to use a large bandwidth and requires a wide band receiver.

It is also known to employ a single wavelength with some encoded identification information as a part of the transmission. The base unit would then determine the particular unit received by the identification code. There is a problem with this technique. It is likely that two or more such units in the same vicinity will transmit at the same time. This prevents the receiving unit from distinguishing the respective identification codes.

It is known in the art to employ responsive units which transmit only in response to receipt of a signal from a base unit. Such systems include passive systems that take power from the received signal and transmit on a differing wavelength and active systems that are self powered. This technique does not prevent transmission collision. It is possible for two units to be near the base unit and respond simultaneously to the triggering signal.

Another lack in known tracking and control systems is in detection of interaction between things tracked. The prior art tracking and control systems have a remote unit mounted on the things tracked and a base unit disposed in a portal or area where control or tracking is desired. In tracking the movements of wild animals, for example, it may be desirable to determine the interaction between animals outside the range of any base unit. There is no provision for determining interactions between things to be tracked outside the range of a base unit in the prior art. This is because the portable units have no manner of detecting other portable units.

It would therefore be useful to provide a communication and identification system that prevents repeated transmitter collisions and that permits logging of interaction between units outside the range of any base unit.

SUMMARY OF THE INVENTION

This invention is a miniaturized communications unit for use in object tracking, control and the like. Each communications and identification unit repeatedly transmits an identification code on a predetermined wavelength. The transmission interval is randomly selected from within a predetermined time interval range in order to avoid repeated transmission collisions between two or more units.

The communications and identification units may additionally include a sensor. This sensor detects some changeable environmental attribute near the unit. Each transmission then further includes data corresponding to the sensed environmental attribute.

Other communications and identification units receiving these transmissions store the received identification code. This provides a time ordered record of other units in communication with that unit. In the event that data is also transmitted with the identification code, this is also stored. This stored record preferably also includes an electronic date and time stamp in the form of a digital signal indicative of the current day and time. Each communications and identification unit includes an external data port. The stored data can be transmitted to this external data port for later use or analysis by an external data processor.

The identification code for each unit is entered via a user specified identification code. This may be achieved via a bank of single pole single throw switches interpreted as a digital code.

The transmissions are preferably either infrared or radio frequency. Infrared transmissions are made via an infrared light emitting diode and received via an infrared sensitive photo diode. The photo diode has a reception pattern that substantially corresponds to the transmission pattern of the light emitting diode. Radio frequency transmissions are made via a transistor pulsed oscillator. The radio frequency transmission and reception are omnidirectional.

The preferred construction of these communications and identification units includes a programmed microprocessor circuit. This microprocessor handles the control of processes within the unit including generation of the pulsed carrier encoding for transmission and decoding the received pulsed carrier. The program is preferably stored in an electrically programmable read only memory for the sake of flexibility and ease of alternation.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1:
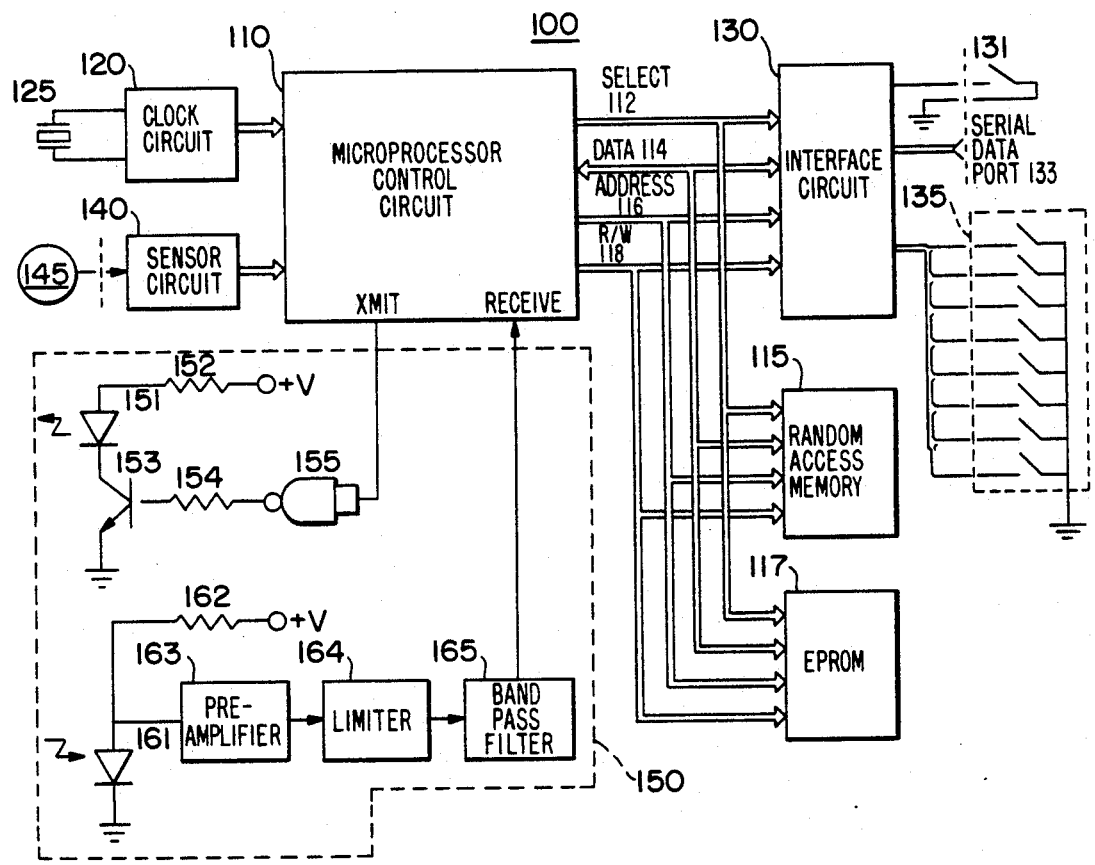
FIG. 1 illustrates in block diagram form the miniaturized communication and identification system of the present invention.

FIG. 1 illustrates the construction of the miniaturized communication and identification unit 100 of the present invention in block diagram form. Each communication and identification unit 100 includes: microprocessor control circuit 110; circuit select lines 112; data bus 114; random access memory 115; address bus 116; electrically programmable read only memory 117; read/write select lines 118; clock circuit 120 with piezoelectric crystal 125; interface circuit 130; external mode switch 131; serial data port 133; identification code switches 135; sensor circuit 140 with sensor 145; and transceiver 150.

Microprocessor control circuit 110 controls the operation of communication and identification unit 100. Microprocessor control circuit 110 operates with clock circuit 120. Clock circuit 120 operates on a timed cycle controlled by the resonance frequency of piezoelectric crystal 125 to produce timing pulses required for the operation of microprocessor control circuit 110. Clock circuit 120 also produces a signal indicating the current time. Microprocessor circuit 110 employs this current time signal to control time related processes in a manner which will be more fully described below.

Microprocessor control circuit 110 is coupled via circuit select lines 112, data bus 114, address bus 116 and read/write select lines 118 to random access memory 115, electrically programmable read only memory 117 and interface circuit 130. Circuit select lines 112 permit microprocessor control circuit 110 to select access to only one of random access memory 115, electrically programmable read only memory 117 and interface circuit 130 at a time. Data is exchanged with the selected circuit via data bus 114. The address specified by microprocessor control circuit 110 on address bus 116 determines the location accessed within random access memory 115 and electrically programmable read only memory 117. Read/write select lines 118 signals random access memory 115, electrically programmable read only memory 117 and interface circuit 130 whether microprocessor control circuit 110 is writing data or reading data. Read/write select lines are preferably in the form of a read address valid signal and a write address valid signal that are sensed by the selected circuit and permits the requested data transfer.

Random access memory 115 is employed for the temporary storage of data under control of microprocessor control circuit 110. As will be further detailed below, one manner of use of random access memory 115 is to store the identification code and transmitted data received from another communication and identification unit 100 together with an indication of the current time when this signal is received. This saves a time ordered list of all the other communication and identification units 100 with which have interacted with the present communication and identification unit 100. Another use is for storage of a time ordered list of data sensed by sensor circuit 140. In the preferred embodiment random access memory 115 consists of 32 kilobytes of memory.

Electrically programmable read only memory 117 preferably stores a program for control of microprocessor control circuit 110. Microprocessor control circuit 110 sequentially executes this program during operation of the communication and identification unit 100. In accordance with the prior art, this program includes branches and loops that are executed based upon the then current status of microprocessor control circuit 110. In the preferred embodiment electrically programmable read only memory 117 consists of 8 kilobytes.

Electrically programmable read only memory 117 is programmed before introduction into communication and identification unit 100. This process of programming is known in the art. Some types of electrically programmable read only memory can be altered or reprogrammed at a later time. This process permits assembly of a system including several communication and identification units 100 having differing programs and thus performing differing functions. The use of programmable read only memories is ideal for custom systems of plural communication and identification units 110 because the particular program within any such unit can be particularly written for the expected use.

In instances where a large number of communication and identification units 100 are to have the same program it is preferably to use read only memory in place of electrically programmable read only memory. Read only memory includes the program fixed during manufacture and not alterable later. The marginal cost for a read only memory is less than that of electrically programmable read only memory, however there are substantially greater start up costs with read only memory. Thus read only memory is preferred only for uses in which there are thousands or tens of thousands of identically programmed communication and identification units 100. Even in cases where the number of units justifies use of read only memory, it is preferably to use programmable read only memory for program development and debugging purposes. It is also feasible to assemble a system of plural communications and identification units 100 using some units programmed with read only memory and some units programmed with electrically programmable read only memory.

The program stored within electrically programmable read only memory 117 is not alterable by microprocessor control circuit 110. A correct program will not include a command to write to electrically programmable read only memory 117. If electrically programmable read only memory 117 is selected via circuit select lines 112 and a write operation is selected via read/write select lines 114 through some mistake in the program, this operation is ignored by electrically programmable read only memory 117.

Interface circuit 130 permits microprocessor control circuit 110 to communicate with several devices. Interface circuit 130 includes connections to external mode switch 131. External mode switch 131 is an external switch employed to change the mode of communication and identification unit 100. When external mode switch 131 is absent or open, communication and identification unit 100 operates in a normal mode. When external mode switch 131 is present and closed, communication and identification unit 100 operates in a mode to communicate with an external apparatus via serial data port 133. Communication and identification unit 100 may exchange data with an external computer via serial data port 133 in a manner that will be further described below.

Interface circuit 130 is also connected to identification code switches 135. Identification code switches 135 preferably consist of eight miniature single pole single throw switches that are semi-permanently operated to provide an eight bit identification code. It is conventional to provide a bank of such switches in a dual in line package similar to those employed to house integrated circuits. This identification code is employed for identification of the transmission of the particular communication and identification unit 100.

Communication and identification unit 100 includes sensor circuit 140 which is optionally connected to sensor 145. If provided, sensor 145 is connected to sensor circuit 140, which is further connected to microprocessor control circuit 110. Sensor 145 is disposed to detect at least one changeable environmental attribute of the object to which communication and identification unit 100 is attached. This attribute could be temperature, pressure, operation rate or the like. Numerous sensors for measuring such attributes are known in the art. Sensor circuit 140 produces a digital indication of this measured attribute for transmission to microprocessor control circuit 110. Microprocessor control circuit 110 is preferably programmed via electrically programmable read only memory 117 to process, store and/or transmit data corresponding to this measured attribute.

Microprocessor control circuit 110 is coupled to transceiver 150. Transceiver 150 is preferably an infrared transceiver that has a directionality. Communication and identification unit 110 is coupled to an object so that the infrared light has a predetermined direction. Transmissions are preferably made via a GaAs infrared light emitting diode 151 that operates on a wavelength of 880 nanometers. Light emitting diode 151 is biased via resistor 152 and switched ON and OFF by transistor 153. NAND gate 155 acts as an invertor and provides base bias current to transistor 153 via resistor 154. In the preferred embodiment, microprocessor control circuit 110 provides a signal at the Xmit output including both the carrier and the signal encoding. This process will be more fully disclosed below in conjunction with the description of FIGS. 2a and 2b.

The receiver of transceiver 150 includes photo diode 161. Photo diode 161 is sensitive to the near infrared region that includes the 880 nanometer transmission wavelength of light emitting diode 151. Photo diode 161 has a field of view that substantially corresponds to the transmission beam of light emitting diode 151. Photo diode 161 is biased via resistor 162. The output of photo diode 161 is supplied to preamplifier 163 which is followed by limiter 164 and band pass filter 165. Band pass filter 165 has a pass band that includes the modulation frequency of the transmissions.

Figure 2A:
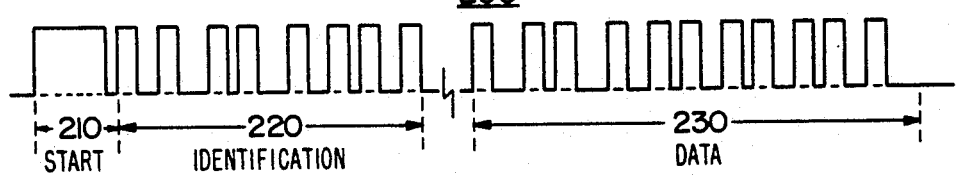
FIGS. 2a and 2b illustrate the transmission encoding technique employed in the preferred embodiment of the present invention.
Figure 2B:
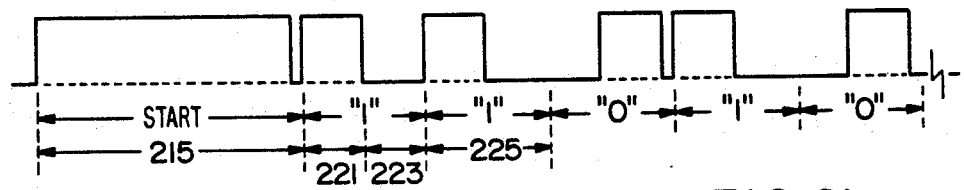

FIGS. 2a and 2b illustrate the transmission protocol employed in transceiver 150. As illustrated in FIG. 2a, each transmission 200 includes a start pulse 210, an identification code 220 and may optionally include data 230.

Start pulse 210 is a long pulse of the carrier frequency. This start pulse 220 is employed to alert the receiver that a transmission is underway before the time that any encoded data is transmitted. In the preferred embodiment this carrier frequency is 40 kHz. Start pulse 220 has a length 225.

The identification code 220 is transmitted following the start pulse 210. As previously described, this identification code 220 is preferably of eight bits set by identification code switches 135. In the preferred embodiment of this invention the identification code 220 is Manchester encoded. This is better illustrated in FIG. 2b. Each "1" bit of the identification code 220 includes an interval of time 221 during which the 40 kHz carrier is present followed by an equal interval of time 223 during which the 40 kHz carrier is absent. The "0" bits are encoded in the opposite sense with an initial OFF interval followed by an ON interval. In the preferred embodiment of this invention, the respective intervals 221 and 223 are 500 microseconds making a total bit length 225 of 1 millisecond.

The transmission protocol ends with data 230. In the event that the particular communication and identification unit 100 includes a sensor 145, then the data produced by sensor circuit 140 indicating an environmental attribute near communication and identification unit 100 is transmitted. Data 230 is preferably also Manchester encoded in the same manner as the identification code 220. This data 230 may be of variable length depending upon the environmental attribute measured by sensor 145 and the data signal produced by sensor circuit 140.

Figure 3:
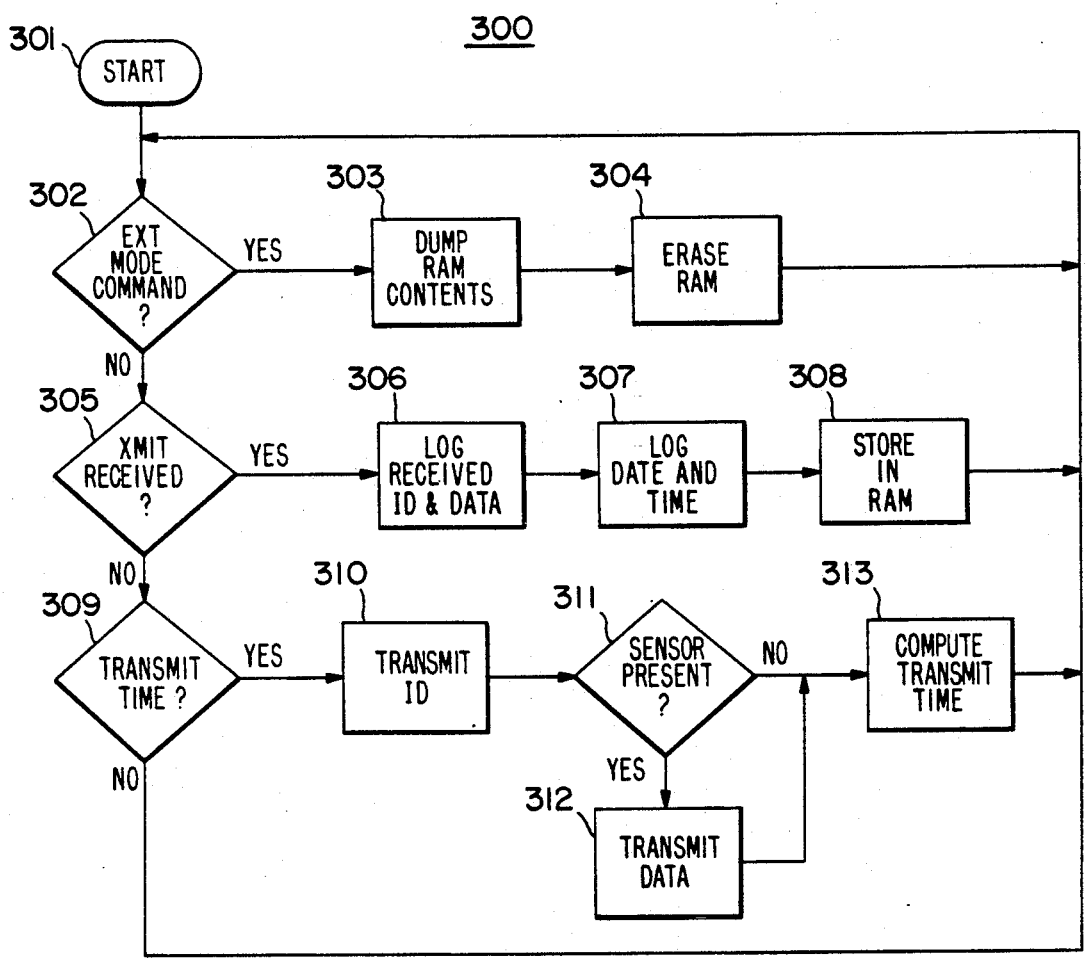
FIG. 3 illustrates in flow chart form the operation of the microprocessor control circuit of the present invention.

FIG. 3 illustrates a flow chart of program 300 used to control the operation of microprocessor control circuit 110 in the present invention. Program 300 illustrated in FIG. 3 is not intended to show the exact details of the program for control of microprocessor control circuit 110. Instead, program 300 is intended to illustrate only the overall general steps employed in this program. Those skilled in the art of microprocessor programming would be enabled to provide the exact details of the program required for control of microprocessor control circuit 110 from program 300 illustrated here and the other descriptions of the present application once the selection of the microprocessor unit to embody microprocessor control circuit 110 is made, together with its associated instruction set.

Program 300 begins at start block 301. Start block 301 preferably encompasses an initial diagnostic program and various housekeeping and initiation functions. These processes are performed upon each initial application of electric power to communication and identification unit 100.

Program 300 then begins a continuous loop that is repeatedly executed. Program 300 first tests to determine if an external mode command has been received (decision block 302). This external mode command is received from an external computer by closing external mode switch 131. Interface circuit 130 detects this condition and signals microprocessor control circuit 110. Once this condition is detected, microprocessor control circuit 110 transfers the data stored in random access memory 115 to serial data port 133 via interface circuit 130 (processing block 303). This process may require that microprocessor control circuit 110 to read a byte of data from random access memory 115 and then to write that byte to interface circuit 130 using circuit select lines 112, address bus 116 and 118 for control of this data transfer via data bus 114. These operations were described above. Interface circuit 130 then transmits this data to the external computer via serial data port 133. Upon completion of this process, microprocessor control circuit 110 erases the contents of random access memory 115 (processing block 304). This permits random access memory 115 to be used again for logging received identification codes and data. Program 300 then returns to the beginning of the continuous loop at decision block 302 to repeat the loop.

If no external mode command has been received, then program 300 tests to determine whether transceiver 150 has received a transmission (decision block 305). As illustrated in FIG. 1, such a transmission is an infrared signal detected by photo diode 161. If so, this signal is detected at the receive input of microprocessor control circuit 110. Microprocessor control circuit 110 then decodes and logs the identification code and any data included in this transmission (processing block 306). In accordance with the components illustrates in FIG. 1, microprocessor control circuit 110 receives the demodulated pulsed carrier at 40 kHz including the start pulse 210, the identification 220 and any data 230. Microprocessor control circuit 110 is programmed to determine the identification code and data of this transmission employing timing signals from clock 120.

Microprocessor control circuit 110 next logs the current date and time indicated by clock circuit 120 (processing block 307). This information is then stored in the next available memory locations within random access memory 115 (processing block 308). Thus random access memory 115 stores a time sequential log of other communication and identification units 110 that contacted the present unit. Program 300 then returns to the beginning of the loop at decision block 302.

In the event that neither an external mode command nor a transmission is received, then program 300 checks to determine if it is time for transmission (decision block 309). This process takes place by microprocessor control circuit 110 checking a previously computed time to transmit against the current time indicated by clock circuit 120. Microprocessor control circuit 110 initiates a transmission only if the current time is equal to or after the computed transmission time. If this is not the case, then program 300 returns to decision block 302 to repeat the loop.

If it is time to transmit, then communication and identification unit 100 transmits its identification code (processing block 310). If a sensor 145 is present (decision block 311), then the identification code is followed by data from sensor circuit 140 (processing block 312). This data corresponds to environmental attribute sensed by sensor 145. In the preferred embodiment, program 300 includes instructions enabling microprocessor control circuit 110, in conjunction with timing signals from clock circuit 120, to produce the pulsed 40 kHz carrier illustrated in FIGS. 2a and 2b at its Xmit output. Programming microprocessor control unit 110 to produce the pulsed carrier reduces the need for special purpose hardware within transceiver 150.

In the present invention communication and identification unit 100 transmits at variable intervals to avoid repeated transmission collisions between plural units. For example, one communication and identification unit 100 may be employed at a fixed location to detect and log the presence of other movable units. This process can be defeated if two or more of the movable units transmit at the same time. In order to prevent repeated simultaneous transmissions by two or more units, each communication and identification unit 100 transmits at a varying interval of time. After a transmission, program 300 computes the time for the next transmission (processing block 313). It is preferable that the computed transmission time interval vary over a predetermined range in a nearly random fashion. It is sufficient for the present invention that each communication and identification unit 100 employ a pseudo random number generator using a different seed. The computed transmission interval is then added to the current time to produce the time for the next transmission. Using this process two communication and identification units 100 that transmit in an overlapping fashion will likely select differing transmission times for their next transmission and thus not overlap repeatedly. Once the next transmission time is computed program 300 returns to decision block 302 to repeat the loop.

Figure 4:
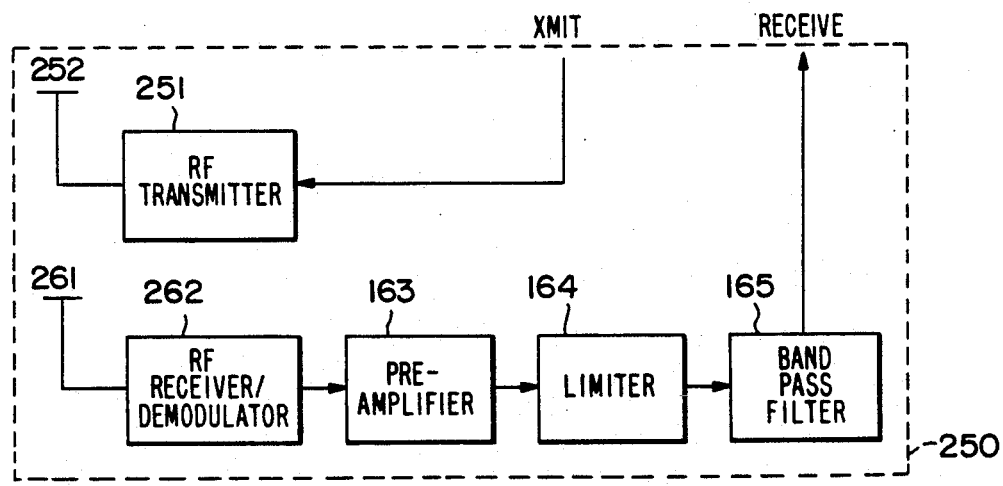
FIG. 4 illustrates in block diagram form a radio frequency transceiver employed in an alternative embodiment of the present invention.

FIG. 4 illustrates in block diagram form an alternative transceiver 250. In this alternative embodiment the transmission is in the radio frequency region, preferably at approximately 300 MHz. Radio frequency transmitter 251 is responsive to the Xmit output of microprocessor control circuit 110 and produces its output on antenna 252. Radio frequency transmitter 251 is preferably a transistor pulsed oscillator whose ON and OFF intervals are controlled by the Xmit output of microprocessor control circuit 110 in the same fashion as the infrared transceiver 150 described above. Thus microprocessor control circuit 110 produces both the 40 kHz carrier and the encoded data via the Xmit output. Alternative transceiver 250 includes radio frequency receiver/detector 262 that receives signals via antenna 216. the demodulated signal consisting of the pulsed 40 kHz carrier is supplied to preamplifier 163 which is followed by limiter 164 and band pass filter 165 in the same manner as previously disclosed.

The alternative infrared and radio frequency transceivers are useful in differing contexts. Infrared transmissions are well suited to applications where a directional transmission is desired. This would be the case if the facing direction of the object to be tracked or controlled is important. Radio frequency transmissions are well suited to applications needing omni-directional response. Such would be the case where the presence or absence of the object to be tracked or controlled is important irrespective of its orientation.

We claim:
1. A communications unit comprising:
   an identification unit for entering a user specified identification code;
   a clock circuit for generating a digital time signal indicative of the current time;
   a writable memory;
   a transmitter for producing an encoded radiant energy transmission at a predetermined wavelength;
   a radiant energy receiver for receiving encoded radiant energy transmissions at said predetermined wavelength;
   a control circuit connected to said identification unit, said clock circuit, said writable memory, said transmitter and said radiant energy receiver operative to
      decode the radiant energy transmissions received by said receiver thereby producing decoded data,
      store said decoded data and the current digital time signal within said writable memory for each encoded radiant energy transmission in the order of receipt, and
      control said transmitter to produce said radiant energy transmission encoded with said identification code at varying intervals of time randomly selected within a predetermined range of time.
2. The communications unit claimed in claim 1, further comprising:
   a sensor connected to said control circuit for producing a digital signal indicative of an environmental attribute in the vicinity of the communications unit; and
   whereby said control circuit is further operative
      control said transmitter to produce said radiant energy transmission further encoded with said digital signal indicative of an environmental attribute.

3. The communications unit claimed in claim 2, wherein:
said control circuit is further operative to store said decoded data including said digital signal indicative of an environmental attribute encoded on said radiant energy transmission of another communications unit.

4. The communications unit claimed in claim 1, further comprising:
a data port connected to said control circuit for transmitting data from the communications unit to an external device; and
wherein said control circuit is further operative to recall the contents of said writable memory and transmit said recalled contents via said data port.

5. The communications unit claimed in claim 1, wherein:
said transmitter comprises an infrared light emitting diode having a directional transmission pattern; and
said radiant energy receiver comprises a photo diode sensitive to infrared light having a directional reception pattern corresponding to said direcitonal transmission pattern.

6. The communications unit claimed in claim 1, wherein:
said transmitter comprises a radio frequency transmitter having an omni-directional transmission pattern; and
said radiant energy receiver comprises a radio frequency receiver having an omni-directional reception pattern.

7. The communications unit claimed in claim 1, wherein:
said control circuit includes
a microprocessor unit, and
a program memory coupled to said microprocessor unit having a program stored therein operative to control said microprocessor unit.

8. The communications unit claimed in claim 7, wherein:
said program memory consists of an electrically programmable read only memory.

9. The communications unit claimed in claim 4, wherein:
said control unit is further operative to erase and reuse said writable memory after transmitting said recalled data via said data port.

10. A communications system comprising:
a plurality of communications units, at least some of said communications units mounted on things to be tracked, each communications unit including
an identification unit for entering a user specified identification code;
a clock circuit for generating a digital time signal indicative of the current time;
a writable memory;
a transmitter for producing an encoded radiant energy transmission at a predetermined wavelength;
a radiant energy receiver for receiving encoded radiant energy transmissions at said predetermined wavelength;
a control circuit connected to said identification unit, said clock circuit, said writable memory, said transmitter and said radiant energy receiver operative to
decode the radiant energy transmissions received by said receiver thereby producing decoded data,
store said decoded data and the current digital time signal within said writable memory for each encoded radiant energy transmission in the order of receipt, said decoded data including at least said identification code of another communications unit, and
control said transmitter to produce said radiant energy transmission encoded with said identification code at varying intervals of time randomly selected within a predetermined range of times.

11. The communications system claimed in claim 10, wherein:
at least some of said communications units further include
a sensor connected to said control circuit for producing a digital signal indicative of an environmental attribute in the vicinity of the communications unit; and
whereby said control circuit is further operative to control said transmitter to produce said radiant energy transmission further encoded with said digital signal indicative of an environmental attribute.

12. The communications system claimed in claim 11, wherein:
each of said communications units wherein
said control circuit is further operative to store said decoded data including said digital signal indicative of an environmental attribute encoded on said radiant energy transmission of another communications unit.

13. The communications system claimed in claim 10, wherein:
each of said communications units further includes
a data port connected to said control circuit for transmitting data from the communications unit to an external device; and
wherein said control circuit is further operative to recall the contents of said writable memory and transmits recalled contents via said data port.

14. The communications system claimed in claim 13, wherein:
each of said communications units wherein
said control unit is further operative to erase and reuse said writable memory after transmitting said recalled contents via said data port.

15. The communications system claimed in claim 10, wherein:
each of said communications units wherein
said transmitter comprises an infrared light emitting diode having a directional transmission pattern; and
said radiant energy receiver comprises a photo diode sensitive to infrared light having a directional reception pattern corresponding to said direcitonal transmission pattern.

16. The communications system claimed in claim 10, wherein:
each of said communications units wherein
said transmitter comprises a radio frequency transmitter having an omni-directional transmission pattern; and
said radiant energy receiver comprises a radio frequency receiver having an omni-direcitonal reception pattern.

* * * * *